United States Patent
Kim et al.

(10) Patent No.: US 10,506,156 B2
(45) Date of Patent: Dec. 10, 2019

(54) ELECTRONIC DEVICE HAVING CAMERA MODULE

(71) Applicant: Samsung Electronics Co., Ltd., Gyeonggi-do (KR)

(72) Inventors: Joo-Hyung Kim, Seoul (KR); Woo-Jung Moon, Seoul (KR); Haruo Hayashi, Seoul (KR); Jong-Yun Jeoung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/062,368

(22) PCT Filed: Dec. 26, 2016

(86) PCT No.: PCT/KR2016/015282
§ 371 (c)(1),
(2) Date: Jun. 14, 2018

(87) PCT Pub. No.: WO2017/119653
PCT Pub. Date: Jul. 13, 2017

(65) Prior Publication Data
US 2018/0352159 A1    Dec. 6, 2018

(30) Foreign Application Priority Data
Jan. 5, 2016   (KR) .................. 10-2016-0001093

(51) Int. Cl.
*H04N 5/232* (2006.01)
*G02B 13/06* (2006.01)
(Continued)

(52) U.S. Cl.
CPC ......... *H04N 5/23238* (2013.01); *G02B 13/06* (2013.01); *G03B 17/04* (2013.01);
(Continued)

(58) Field of Classification Search
CPC ............ H04N 5/23238; H04N 13/239; H04N 5/23227; H04N 5/2252; H04N 5/2253;
(Continued)

(56) References Cited

U.S. PATENT DOCUMENTS 9,563,105 B1 * 2/2017 Kozko .................... G06T 11/00
2008/0056708 A1 * 3/2008 Kim ....................... G03B 37/06
396/427
(Continued)

FOREIGN PATENT DOCUMENTS

JP      2010-197938 A    9/2010
KR    10-0994442 B1    11/2010
(Continued)

*Primary Examiner* — John R Schnurr
(74) *Attorney, Agent, or Firm* — Cha & Reiter, LLC.

(57) ABSTRACT

According to various examples of the present invention, an electronic device having a first camera module comprises: a housing; a lens assembly arranged in the inside of the housing and including at least one wide-angle lens; an image sensor arranged at the lower part of the lens assembly and converting a semi-spherical optical image, which is transferred from the lens assembly, into an electric signal; a base arranged at the lower part of the housing and having the image sensor or a printed circuit unit mounted therein; and a combination unit arranged at one surface of the base so as to induce coupling with an external device, and including at least one magnet. According to various examples of the present invention, a user can conveniently acquire a desired image when photographing an object, by designing the electronic device having the camera of which an angle of view can be readily switched to 180° or 360°.

15 Claims, 12 Drawing Sheets

(51) Int. Cl.
*G03B 37/00* (2006.01)
*H04N 13/239* (2018.01)
*H04N 5/225* (2006.01)
*G03B 17/04* (2006.01)
*G03B 17/56* (2006.01)
*G03B 19/22* (2006.01)
*G03B 37/04* (2006.01)

(52) U.S. Cl.
CPC .......... *G03B 17/561* (2013.01); *G03B 19/22* (2013.01); *G03B 37/00* (2013.01); *G03B 37/04* (2013.01); *H04N 5/2252* (2013.01); *H04N 5/2253* (2013.01); *H04N 5/2254* (2013.01); *H04N 5/2258* (2013.01); *H04N 5/232* (2013.01); *H04N 5/23227* (2018.08); *H04N 13/239* (2018.05); *G03B 2206/00* (2013.01)

(58) Field of Classification Search
CPC .... H04N 5/2254; H04N 5/2258; H04N 5/232; G02B 13/06; G03B 37/00; G03B 17/04; G03B 17/561; G03B 19/22; G03B 37/04; G03B 2206/00
See application file for complete search history.

(56) References Cited

U.S. PATENT DOCUMENTS

| | | | |
|---|---|---|---|
| 2011/0310293 | A1 | 12/2011 | Yamauchi et al. |
| 2014/0049638 | A1* | 2/2014 | Huang ................ H04N 5/2252 348/143 |
| 2014/0168443 | A1 | 6/2014 | Aguilar et al. |
| 2014/0267586 | A1* | 9/2014 | Aguilar ............. H04N 5/23238 348/36 |
| 2017/0331986 | A1* | 11/2017 | Houba ................ H04N 5/2253 |

FOREIGN PATENT DOCUMENTS

| | | |
|---|---|---|
| KR | 10-2014-0048764 A | 4/2014 |
| KR | 10-2015-0115294 A | 10/2015 |

* cited by examiner

ELECTRONIC DEVICE HAVING CAMERA MODULE

CROSS-REFERENCE TO RELATED APPLICATION

This application is a National Phase Entry of PCT International Application No. PCT/KR2016/015282, which was filed on Dec. 26, 2016, and claims priority to Korean Patent Application No. 10-2016-0001093, which was filed on Jan. 5, 2016, the contents of which are incorporated herein by reference.

1. FIELD

The present disclosure relates to a structure of an electronic device having a removable camera module having a view angle of 180 degrees or more.

2. DESCRIPTION OF RELATED ART

Recently, the development of cameras has been accelerated, and as the distribution of the cameras has expanded, the proportion of capturing panorama images or three-dimensional stereoscopic images through cameras having a view angle of 180 degrees or more is gradually increasing in people's lives.

In addition, a camera capable of acquiring panorama images or three-dimensional images may be used for a facility (e.g., a museum) for a service for providing realistic guidance, or for a public facility such as a museum as a surveillance camera that does not have a blind spot, or the like.

Meanwhile, with the conventional 180-degree or 360-degree panorama imaging camera, each equipped with a single lens, it is impossible to capture an image in the state in which two identical products are joined to each other, and even after image-capturing, it is necessary to stitch two images by software. With the 360-degree camera used in the state in which two lenses are fixed, it is possible to capture an image and to stitch images by hardware and software, but there is a problem in that the cameras cannot be used as independent cameras. In addition, the conventional 360-degree panorama camera has problems in that since multiple lenses are used, the camera is large and heavy, and since the camera has a complicated structure, the camera is expensive.

SUMMARY

The present disclosure is to provide an electronic device having a camera, which is designed such that a modular camera having a view angle of 180 degrees or a view angle of 180 degrees or more can be easily separated and coupled, thereby providing various use modes.

Further, the present disclosure is to provide a camera module having high stability in transmission and processing of an image with a wired connection through a terminal.

According to various embodiments, an electronic device, which is provided with a first camera module, includes: a housing; a lens assembly disposed inside the housing and including at least one wide-angle lens; an image sensor disposed under the lens assembly, and configured to convert a hemispherical optical image transmitted from the lens assembly into an electrical signal; a base disposed under the housing and configured to mount the image sensor or a printed circuit unit thereon; and a coupling unit disposed on a face of the base and including at least one magnet inducing coupling with an external device.

In addition, the electronic device may further include a communication unit disposed on a rear surface of the base and including at least one communication terminal configured to communicate the hemispherical optical image captured from the lens assembly, in a wired or wireless manner.

In addition, the coupling unit may include a plate spaced apart from the rear surface of the base, and a support member configured to connect the rear surface of the base and the plate, and at least one through hole connected to an outside may be disposed in the plate.

Further, the coupling unit may include one or more magnets disposed inside the plate, and the magnetics induce magnetic coupling with the external device.

According to various embodiments, the electronic device may further include a second camera module having the same configuration as the first camera module, and the first coupling unit of the first camera module and the second coupling unit disposed on the rear face of the second camera module form a magnetic coupling in face-to-face contact with each other so as to capture a 360-degree omni-directional image.

According to various embodiments, an electronic device may include a first camera module and a circular board configured to transmit/receive data in a wired or wireless manner. The first camera module may include a housing, a lens assembly disposed inside the housing and including at least one wide-angle lens, an image sensor disposed under the lens assembly, and configured to convert a hemispherical optical image transmitted from the lens assembly into an electrical signal, and the circular board may be detachably attached to face the rear face of the camera module, and may be configured to have a battery or a printed circuit mounted thereon.

In addition, in the electronic device, the housing may be provided as a transparent hemispherical shape configured to protect the lens assembly and may further include a base configured to support the image sensor and having at least one first communication terminal disposed thereon for a communication connection with the circular board.

According to various embodiments, a user can conveniently acquire a desired image at the time of capturing an image by designing an electronic device having a camera capable of easily switching a view angle to 180 degrees or 360 degrees.

According to various embodiments, it is possible to realize a structure capable of acquiring a panorama image or a three-dimensional stereoscopic image according to rotation and movement of the lens assembly.

According to various embodiments, it is possible to enhance the stability of image transmission and processing by wired connection through terminals between a plurality of camera modules.

According to various embodiments, it is possible to capture various types of images in a convenient manner by coupling various accessories to a camera, thereby satisfying the needs of consumers.

DETAILED DESCRIPTION

Figure 1:
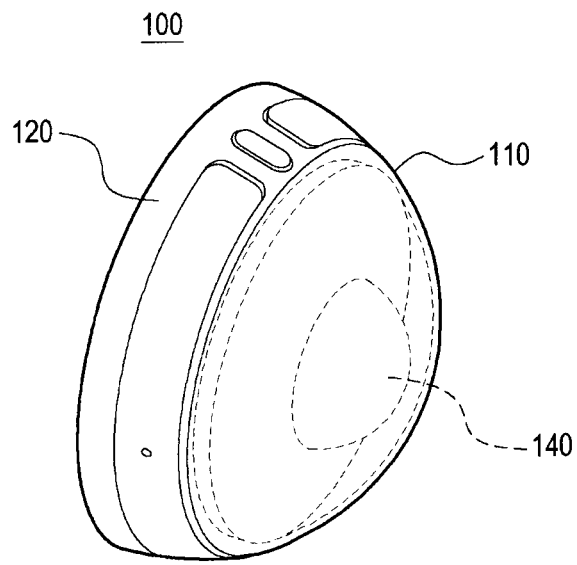
FIG. 1 is a perspective view illustrating the front face of an electronic device including a camera module according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. { } { } In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 2:
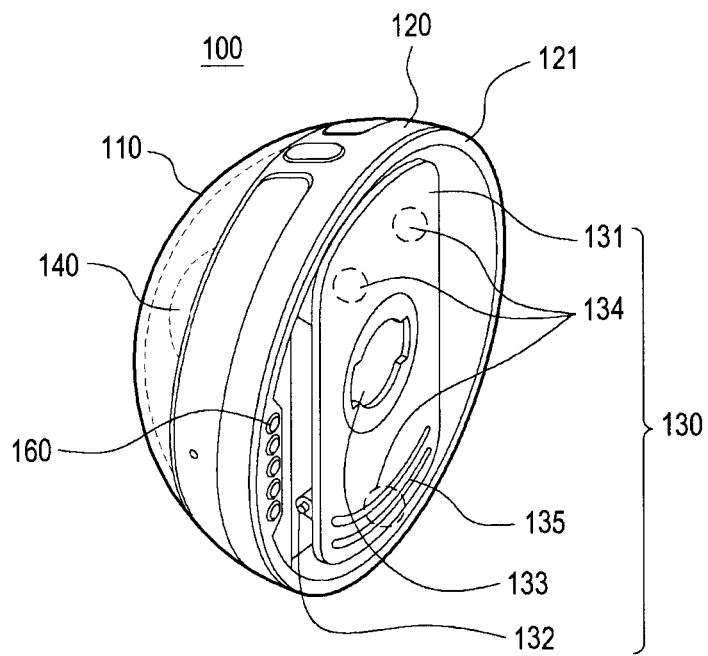
FIG. 2 is a perspective view illustrating the rear face of the electronic device including the camera module according to various embodiments.

FIG. 1 is a perspective view illustrating the front face of an electronic device including a camera module according to various embodiments. FIG. 2 is a perspective view illustrating the rear face of the electronic device including the camera module according to various embodiments.

The electronic device may be a camera module, a smart phone, or a wearable device. External components of an electronic device such as a camera module 100, will be described with reference to FIGS. 1 and 2.

Referring to FIG. 1, the camera module 100 provided in the electronic device is generally designed as a hemispherical shape, and the front face of the camera module 100 may include a housing 110 and a base 120.

The housing 110 is formed as an upper structure of the camera module 100 and is mounted with at least a portion of the lens assembly 140 therein. The housing 110 may be made of a transparent material in order to capture an external image by the lens assembly 140.

The base 120 is formed as a lower structure of the camera module 100 and may have a space for mounting a portion of the lens assembly 140, an image sensor, a printed circuit unit 180, and the like. The base 120 serves to fix and protect the components mounted therein. The outer face of the base 120 may be provided with various buttons for confirming a wired or wireless connection or confirming a connection with an external accessory.

Referring to FIG. 2, the rear face of the camera module 100 may include the base 120, a coupling unit 130, and a communication terminal 160.

The base 120 is disposed to surround the rear face and a portion of the front face of the camera module 100, and may form a support face when the camera module 100 is installed on an external ground. In addition, when the camera module 100 is coupled to an external device, the base 120 may form a portion of a bonding face.

The external device may be a device including a camera module, which is the same as the camera module 100. In addition, the external device may include various devices such as a device for capturing three-dimensional stereoscopic images and a tripod for capturing an image of a user from a distance.

The base 120 may include a ring protrusion 121 formed by flattening the edge of the base 120 so as to support the camera module 100 without being shaken when the base 120 is installed on an outer bottom face, and the coupling unit 130 may be disposed in the region recessed to the inside of the ring protrusion 120.

The coupling unit 130 may be disposed on one face of the base 120 and may enhance the utility of the electronic device 10 by being coupled with or separated from an external device, which is the same as or different from the camera module 100.

The coupling unit 130 may include a plate 131 and a support member 132. According to an embodiment, the plate 131 is configured to be in direct contact with the external device so as to couple the external device thereto, and may have a size of at least half the size of the rear face of the camera module 100 in order to be stably engaged with the external device.

According to an embodiment, the plate 131 may be generally formed in a rectangular shape with curved corners so as to correspond to the rear face of the circular camera module 100. However, this is merely an example, and it may be designed in various shapes such as a triangular shape and a circular shape in order to be stably coupled with the external device.

According to an embodiment, magnets 134 may be included inside the plate 131. By disposing the magnets 134, an external device capable of being magnetically coupled can be stably coupled when the external device is in contact with the plate 131. For example, the coupling magnets 134 may be arranged on the plate 131 in the form of triangular vertexes so as to induce stable coupling. However, this is an example, and a variety of layout designs such as a quadrilateral shape and a circular shape may be made for stable coupling with an external device. In addition, the magnets 134 may be disposed inside the plate 131 or may be integrally formed with the plate 131 in order to enhance the external appearance.

According to an embodiment, the coupling unit 130 may have one or more detachable protrusions 135, which are disposed on the outer face of the plate 131. The detachable protrusions 135 may enable the plate 131 and the external device to be easily separated from each other in the coupled state. For example, the detachable protrusions 135 are disposed on one side of the plate 131, and form a predetermined space on the coupling face in the state where the camera module 100 and the external device have already been coupled to each other, thereby helping the user physically easily separate the camera module 100 and the external device from each other.

According to an embodiment, the detachable protrusions 135 may be disposed in a curve line shape to correspond to the overall shape of the camera module 100 in order to enable slide coupling or slide separation. Therefore, when the coupling unit 130 of the camera module 100 and the external device are induced to rotate, slide rotation is performed along the curved direction, thereby facilitating coupling and separation. In an embodiment, two detachable protrusion 135 are disposed in a curve line shape, but it is natural that the protrusions 135 may be designed in various structures including a straight-line shape.

According to an embodiment, the plate 131 may be provided with a through hole 133 connected to the outside. The through hole 133 serves to achieve stable fastening through male-female coupling with an external device having a protrusion of a specific shape corresponding to the through hole 133. For example, the through hole 133 may be designed to be disposed inside a recess portion disposed in the outer face of the plate 131. The plate 131 may be disposed to be spaced apart from the base 120 by a predetermined distance and the through hole 133 may extend from the outside to the rear face of the base 120.

According to an embodiment, the plate 131 may include at least one support member 132 such that the plate 131 is disposed to be spaced apart from the rear surface of the base 120. One face of the support member 132 may be connected to the plate 131 and the other face may be connected to the base 120. In addition, the support member 132 may be designed such that a portion of the plate 131 is rotatable using an elastic member having elasticity or including a spiral line. For example, by using a clip-like structure, a portion of the plate 131 may be rotated such that the other portion is separated from with the base 120. This may be mounted on the user's cloth or an external place, so that the user may capture an image of a landscape or a person while moving.

The camera module 100 according to the present disclosure is provided with the coupling unit 130. With various configurations of the coupling unit, the electronic device 10 can be easily connected to an external device by various configurations of the coupling part 130, which may help the user to capture an image conveniently. In addition, when a pair of camera modules 100 having a 180-degree view angle are coupled to each other, a camera capable of 360-degree image-capturing may be easily implemented.

The camera module 100 includes therein a communication unit such that the camera module may communicate therein a moving image or an image obtained through the lens assembly 140 or may communicate the moving image or the image with an external device connected to the camera module 100 through the coupling unit 130. According to an embodiment, at least one communication terminal 160 connected to the communication unit is disposed on the rear face of the base 120, and may perform communication in a wired manner between the camera module 100 and the external device. For example, the communication terminal 160 may transmit/receive data such as a hemispherical image or an omnidirectional image captured from the lens assembly 140, and the external electronic device also requires a terminal capable of transmitting/receiving data to/from the communication terminal 160.

Hereinafter, the inside of the camera module 100 will be described.

Figure 3:
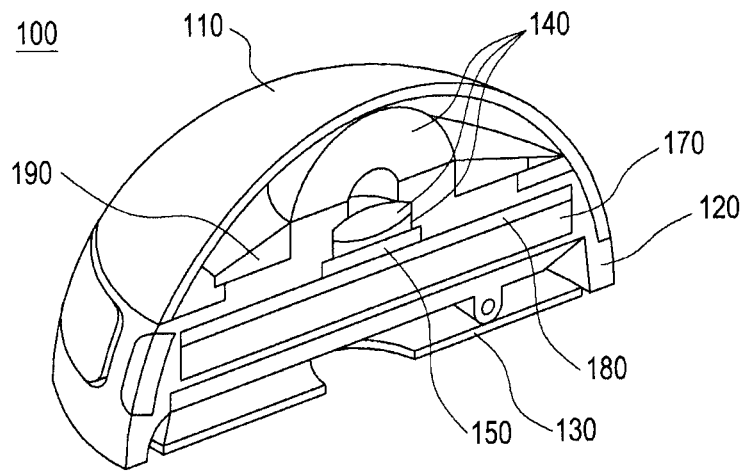
FIG. 3 is a sectional view illustrating the inside of an electronic device including a camera module according to various embodiments.

FIG. 3 is a sectional view illustrating the inside of an electronic device including a camera module according to various embodiments.

Referring to FIG. 3, the camera module 100 may include a housing 110, a lens assembly 140, an image sensor 150, a printed circuit unit 180, a battery 170, and a base 120.

As described above, the housing 100 may serve as a cover for protecting the lens assembly 140 at the top.

The lens assembly 140 is disposed inside the housing 110 and the base 120, and may include at least one wide-angle lens. For example, the wide-angle lens may include various lenses, such as a fisheye lens, an ultra-wide-angle lens, and the like. In one embodiment, the fish-eye lens is an ultra-wide-angle lens having a square angle of more than 180 degrees, and may allow the entire object having a field of view of 180 degrees to be imaged within one circle. The lens assembly 140 may further include an optical member, such as a concave lens or a convex lens, disposed on the light path so as to adjust the focal distance, in addition to the wide-angle lens.

A protective member 190 may be disposed inside the camera housing 100 and outside the lens assembly 140 to be capable of protecting at least a portion of the lenses of the lens assembly 140, and capable of fixing the wide-angle lens. The protective member 190 is disposed to be in contact with the base 120, and is configured to surround the wide-angle lens. For example, the protective member 190 may have an annular shape when viewed from above. Further, the protective lens may be disposed such that the slope thereof is formed to be lowered from the center to the outer side so as not to obscure the field of view of the wide-angle lens.

The image sensor 150 is disposed inside the base 120 and serves to detect the information of a subject obtained from the lens assembly 140 and to convert the information into an electrical image signal. For example, a Charge-Coupled Device (CCD) image sensor or a Complementary Metal Oxide Semiconductor (CMOS) image sensor may be used as the image sensor 150. However, without being limited thereto, other sensor elements, which perform similar functions, may be included.

In an embodiment, one face of the image sensor 150 may be disposed to face the lens assembly 140, and the other face of the image sensor 150 may be disposed to face the printed circuit unit 180. In addition to the image sensor 150 provided in the camera module 100, an operation recognition sensor for recognizing the user's operation and a voice recognition sensor for recognizing the user's voice may be provided within the second camera 100. In addition, each of the sensors may sense various kinds of information according to the user's instructions and may transmit the sensed information to a control circuit.

The printed circuit part 180 is disposed in the base 120, and various electronic elements may be disposed in the form of Integrated Circuits (ICs). The printed circuit unit 180 may include various elements, such as an image processing element for storing and processing an image captured from the lens assembly 140. In addition, wired communication terminals, which are connected to the communication unit of the printed circuit unit 180 and are to be connected to external devices through wired connectors, may be disposed on one face of the base 120.

A battery 170 is disposed below the printed circuit unit 180, and serves to drive various components of the electronic device 10. The battery 170 may be selected from various types that can be charged with energy and can supply energy, and may be charged in a wired or wireless manner.

The base 120 is disposed below the housing 110 and serves as a base for mounting thereon the lens assembly 140, the image sensor 150, the printed circuit 180, and the battery 170 described above. The base 120 may be made using a reinforced material having high hardness (e.g., high strength plastic, glass, or a metallic material) in order to protect the internal components of the camera module 100 from an external impact and to prevent the outer face of the camera module 100 from being scratched. In addition, the base 120 may enhance the aesthetic appearance of the camera module 100 so as to make the user be aesthetically pleasing.

Since the outer face of the base 120 and the coupling unit 130 disposed on the outer face of the base 120 have been described, detailed descriptions thereof will be omitted.

Figure 4:
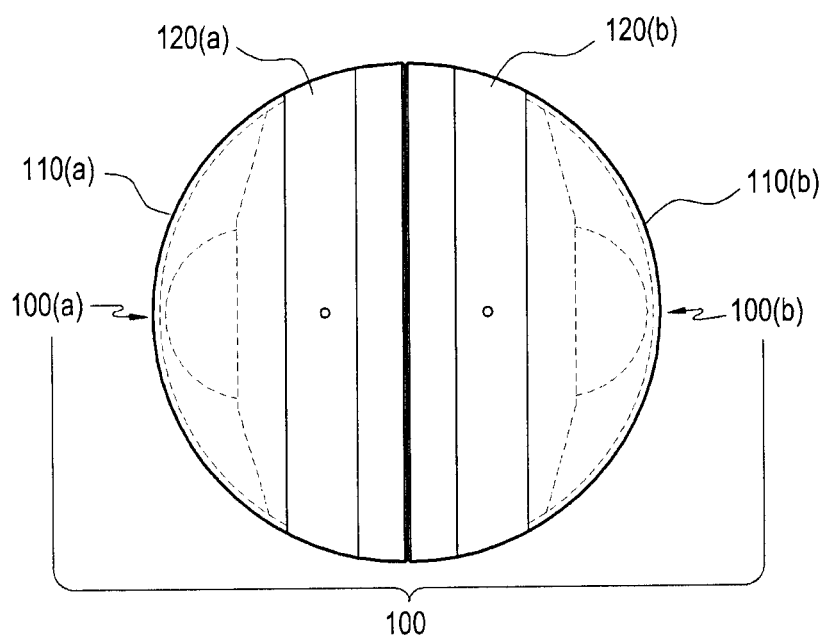
FIG. 4 is a perspective view illustrating the coupling of an electronic device including a plurality of camera modules according to various embodiments.
Figure 5:
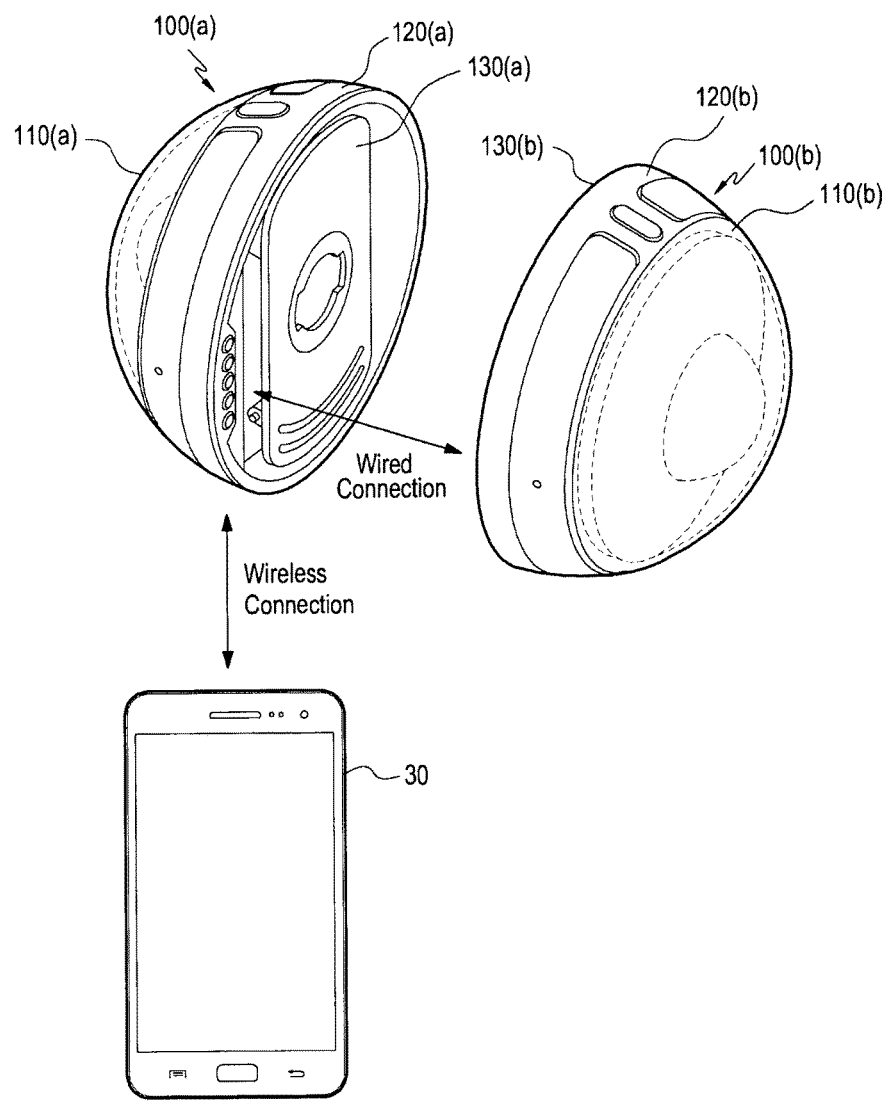
FIG. 5 is a view illustrating a correlation between a mobile device and an electronic device including a camera module according to various embodiments.

FIG. 4 is a perspective view illustrating the coupling of an electronic device including a plurality of camera modules according to various embodiments. FIG. 5 is a view illustrating a correlation between a mobile device and an electronic device including a camera module according to various embodiments.

Referring to FIGS. 4 and 5, the electronic device including the camera module described above may be connected to a mobile device 30 by wireless communication.

An image obtained by the omnidirectional imaging with a pair of camera modules 100 may be processed by an image processing unit of the camera modules 100 or may be transmitted to the wirelessly connected mobile device 30 to be processed in the mobile device 30. According to an embodiment, the wireless connection scheme may include Bluetooth or Wi-Fi, and may be any of similar wireless communication methods.

According to an embodiment, when data is processed in the camera module 100 without transmitting the data to the mobile device 30, a method of stitching the data by an image processing unit in the camera module 100 or storing the data in a memory without the mobile device 30 is used.

However, according to an embodiment, when the electronic device is connected to the mobile device 30 so as to transmit and process data such as an image, a main module is first switched from the camera module 100 to the mobile device 30, and moving images or images captured by the camera module 100 may be collected to the mobile device 30. Accordingly, the captured data may be interlocked in real time with the mobile device 30 so as to easily process moving images or images.

In the embodiment, it has been described that when the mobile device 30 and the camera module 100 are wirelessly connected, the mobile device 30 processes moving images or images as a main module. However, in addition to the above, it is of course possible to communicate with the mobile device 30 with wired communication using USB and to set the camera module 100 as the main module. In addition, the mobile device 30 corresponds to an example, and various devices, which are capable of transmitting data by communicating with the camera module 100 in a wireless or wired manner, may be selected in various ways.

Referring again to FIGS. 4 and 5, it is possible to configure plural camera modules 100 each including the camera module described above and to couple the camera modules 100 to each other. According to an embodiment, it is possible to two or more camera modules 100 and to couple the camera modules 100 to each other.

Hereinafter, the above-described camera module 100 will be referred to as a first camera module 100(a) and a camera module configured to have the same configuration as the first camera module 100(a) and coupled to the first camera module 100(a) will be referred to as a second camera module 100(b). With the help of the configuration of a first coupling unit 130(a) of the first camera module 100(a) and the configuration of a second coupling unit 130(b) of the second camera module 100(b) of the present disclosure, it is easy for the user to physically couple or separate two camera modules 100. The contact portions where the magnets 134 included in the first coupling unit 130(a) and the magnets 134 included in the second coupling unit 130(b) face each other may be configured to have different polarities, so that the first camera module 100(a) and the second camera module 100(b) can be easily coupled to each other.

The first camera module 100(a) may capture a hemispherical first image using the lens assembly, and the second camera module 100(b) may capture a hemispherical second image opposite the first image using the lens assembly. Accordingly, by coupling the first camera module 100(a) and the second camera module 100(b), it is possible to implement a lens assembly having a 360-degree view angle and to capture a panorama moving image or a panorama image. An image synthesized without an error can be acquired through a stitching process in which the first and second captured images are stitched by an image processing unit of the first camera module 100(a) or the second camera module 100(b). Further, when the mobile device 30 is connected, it is possible to acquire a stitched moving image or a stitched image through image processing in real time in the mobile device 30.

The first camera module 100(a) and the second camera module 100(b) may be communicatively connected to each other when respective communication terminals disposed on the rear faces of the bases 120(a) and 120(b) come into contact with each other, in addition to the contact configurations of the coupling units 130(a) and 130(b). The data of the first camera module 100(a) and the data of the second camera module 100(b) can be transmitted to/received from each other through the wired connection of the communication terminals, and after the coupling, a main model may be selected and determined from the first camera module 100(a) and the second camera module 100(b).

Figure 6:
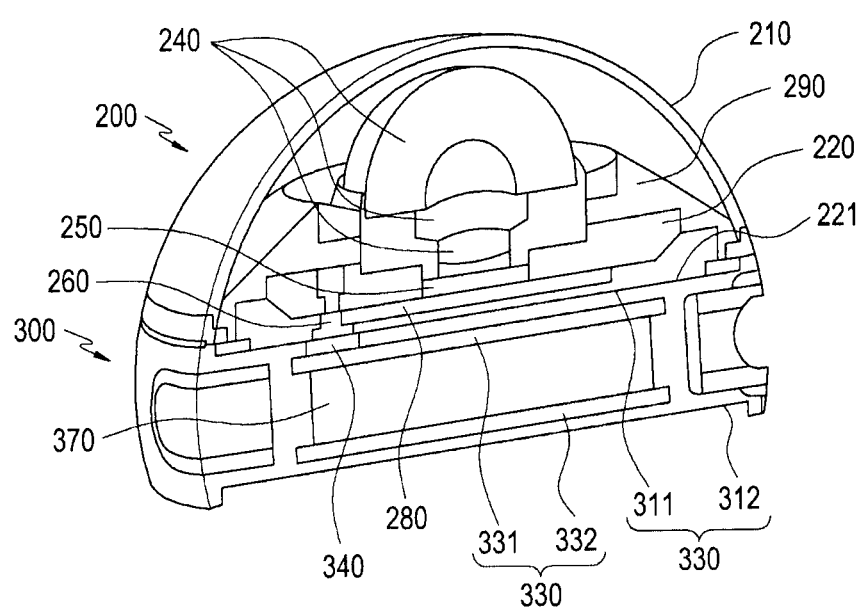
FIG. 6 is a sectional view illustrating an electronic device in which a camera module and a circular board are coupled to each other according to various embodiments.

FIG. 6 is a sectional view illustrating an electronic device in which a camera module and a circular board are coupled to each other according to various embodiments.

Referring to FIG. 6, an electronic device 20 may include a camera module 200 and a circular board 300. The camera module 200 may include a housing 210, a lens assembly 240, an image sensor 250, a printed circuit unit 280, and a base 220. In addition, the circular board 300 detachably attached to the camera module 200 may include a seating portion 310, at least one board printed circuit unit 330, and a battery 370.

The camera module 200 is generally designed in a hemispherical shape, and the front portion of the camera module 100 may include the housing 210 and the base 220.

The housing 210 is formed as an upper structure of the camera module 200 and is mounted with at least a portion of the lens assembly 240 therein. The housing 110 may be made of a transparent material in order to capture an external image by the lens assembly 240.

The base 220 is disposed below the camera module 200 and has a space for mounting a portion of the lens assembly 240, an image sensor 250, a printed circuit unit 280, and the like. The base 220 serves to fix and protect the components mounted therein. The outer face of the base 220 may be provided with various buttons for confirming a wired or wireless connection or confirming a connection with an external accessory.

According to an embodiment, the base 220 may form the rear face of the camera module 200, which forms a support face when the camera module 200 is installed on an external ground. In addition, when the camera module 200 is coupled to an external device, the base 220 may form a portion of a bonding face 221. The bonding 221 may be formed in a protruding stepped shape and may be in male-female coupling with the seating portion 310 of the circular board 300.

The lens assembly 240 is disposed inside the housing 210 and the base 220, and may include at least one wide-angle lens. The wide-angle lens may include, for example, a fish-eye lens, which is an ultra-wide-angle lens having a square angle of more than 180 degrees, and may allow the entire object having a field of view of 180 degrees to be imaged within one circle. The lens assembly 240 may further include an optical member, such as a concave lens or a convex lens, disposed on the light path so as to adjust the focal distance, in addition to the wide-angle lens.

A protective member 290 may be disposed inside the camera housing 210 and outside the lens assembly 240 to be capable of protecting at least a portion of the lenses of the lens assembly 240, and capable of fixing the wide-angle lens. The protective member 290 is disposed to be in contact with the base 220, and is configured to surround the wide-angle lens. For example, the protective member 290 may have an annular shape when viewed from above. Further, the protective lens may be disposed such that the slope thereof is formed to be lowered from the center to the outer side so as not to obscure the field of view of the wide-angle lens.

The image sensor 250 is disposed inside the base 220 and serves to detect the information of a subject obtained from the lens assembly 240 and to convert the information into an electrical image signal. For example, a Charge-Coupled Device (CCD) image sensor or a Complementary Metal Oxide Semiconductor (CMOS) image sensor may be used as the image sensor 250. However, without being limited thereto, another sensor element, which perform similar functions, may be included.

In an embodiment, one face of the image sensor 250 may be disposed to face the lens assembly 240, and the other face of the image sensor 150 may be disposed to face the printed circuit unit 280. In addition to the image sensor 250 provided in the camera module 200, an operation recognition sensor for recognizing the user's operation and a voice recognition sensor for recognizing the user's voice may be provided within the second camera 100. In addition, each of the sensors may sense various kinds of information according to the user's instructions and may transmit the sensed information to a control circuit.

The printed circuit part 280 is disposed in the base 220, and various electronic elements may be disposed in the form of Integrated Circuits (ICs). The printed circuit unit 280 may include various elements, such as an image processing element for storing and processing an image captured from the lens assembly 240. In addition, wired communication terminals, which are connected to the communication unit of the printed circuit unit 280 and are to be connected to external devices through wired connectors, may be disposed on one face of the base 220.

At least one communication terminal 260 may be disposed on the rear face of the base 220, and may perform communication in a wired manner between the electronic device 20 and the external device. For example, the communication terminal 260 may transmit/receive data such as an omnidirectional image taken from a pair of lens assemblies 240, and the external electronic device also requires a terminal capable of transmitting/receiving data to/from the communication terminal 260. Hereinafter, the circular board 300 will be described.

The circular board 300 may have a seating portion 310, configured to mount the camera module 200 thereon, on one face or the other face thereof so that the camera module 200 can be detachably attached to the circular board 300. In addition, the circular board 300 may include at least one printed circuit unit 280 and a battery 370 therein.

The circular board 300 may be configured in a cylindrical shape, and may have a circular first seating portion 311 disposed on one face thereof and a circular second seating portion 312 disposed on the other face thereof.

According to an embodiment, the first seating portion 311 may be formed in a recessed stepped shape and may be configured to correspond to the protruding stepped shape of the bonding face 221 of the base 220. The edge portion of the first seating portion 310 is formed in an annular protruding shape and may be engaged with an annular valley-shaped edge portion of the base 220 through male-female coupling. Accordingly, the first seating portion 310 can be securely coupled with the bonding face 221 when a plurality of projections and valleys are simultaneously contacted and engaged with each other.

According to an embodiment, the circular board 300 may include second communication terminals 340, which are disposed adjacent to the recessed stepped shape of the first seating portion 310 and transmit/receive data such as a captured omnidirectional image from the lens assembly 240. For example, the first communication terminals 260 disposed in the base 220 and the second communication terminals 340 disposed in the first seating portion 310 can exchange data with each other. The second communication terminals 340 may be connected to the second printed circuit unit 330 disposed inside the circular board 300.

According to an embodiment, the circular board 300 may include a second printed circuit unit 330 at the inner center thereof. According to an embodiment, two second printed circuit units 331 and 332 may be disposed on one face and the other face of the circular board 300, respectively, with a battery 370 interposed between each of the two printed circuit units and each of the faces of the circular board 300. The second printed circuit units 331 and 332 may be constituted with a rigid printed circuit board (RPCB) and a flexible printed circuit board (FPCB). On the second printed circuit unit 330, various electronic devices may be disposed in the form of ICs. The second printed circuit unit 330 may include various elements, such as an image processing element for storing and processing a moving image or an image captured from the lens assembly 240.

The second printed circuit unit 330 may be designed such that when only one camera module 200 is disposed on the circular board 300, the second print circuit unit 330 can drive the only one camera and when two camera modules 200 are disposed on both faces of the circular board, the second print circuit unit 330 can drive both the camera modules 200.

According to an embodiment, the circular board 300 may include a battery 370 at the inner center thereof. The battery 370 may be disposed between the second printed circuit units 331 and 332 and serves to supply driving power to elements and components mounted on the second printed circuit units 331 and 332. The battery 370 may be selected from various types that can be charged with energy and can supply energy, and may be charged in a wired or wireless manner.

Figure 7:
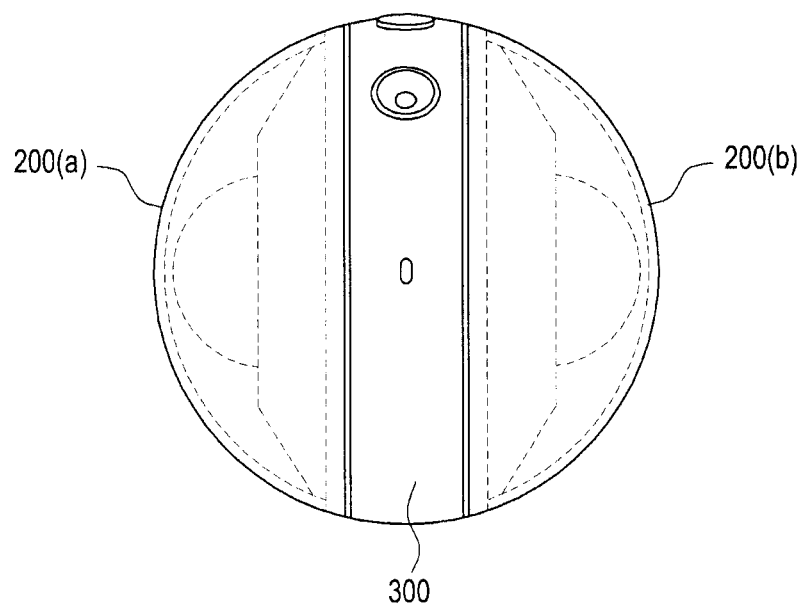
FIGS. 7 to 8 are front views each illustrating a coupling or separation relationship between a plurality of camera modules and a circular board according to various embodiments.
Figure 8:
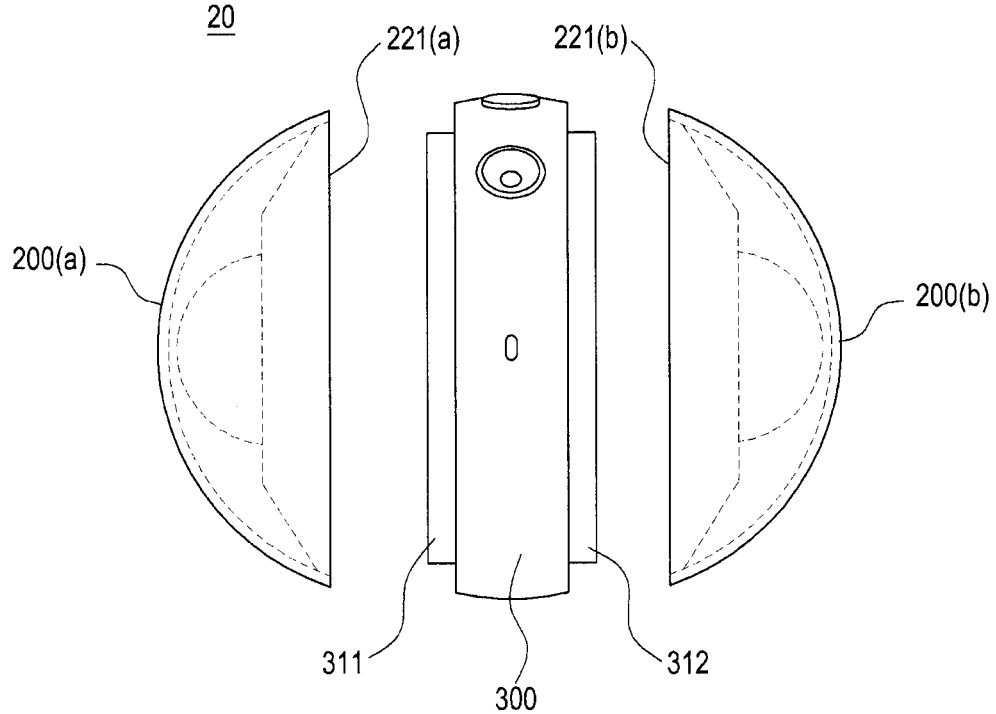

FIGS. 7 to 8 are front views each illustrating a coupling or separation relationship between a plurality of camera modules and a circular board according to various embodiments.

Figure 9:
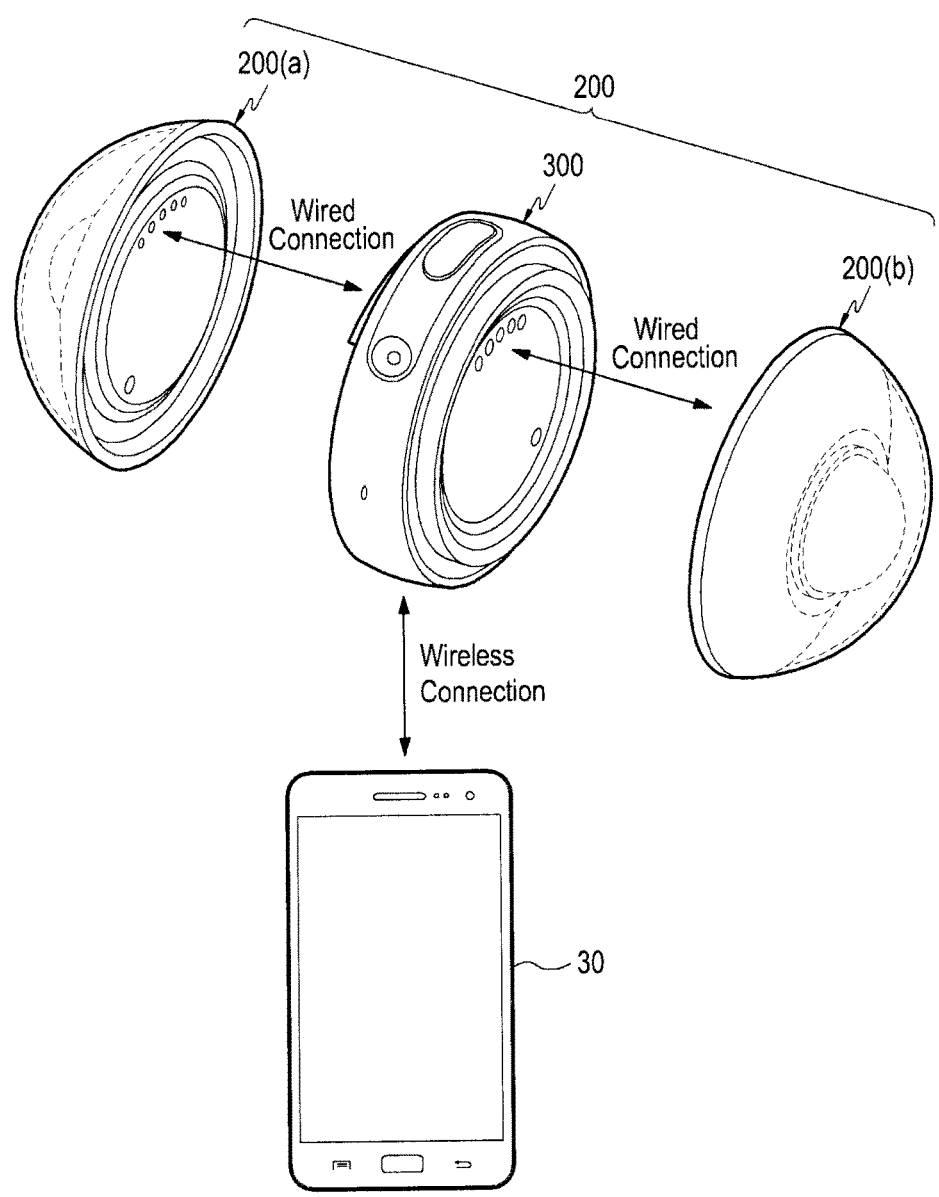
FIG. 9 is a view illustrating a correlation of a plurality of camera modules, a circular board, and a mobile device according to various embodiments.

FIG. 9 is a view illustrating a correlation of a plurality of camera modules, a circular board, and a mobile device according to various embodiments.

Referring to FIGS. 7 and 8, in addition to being able to be coupled with and separated from one camera module 200, the circular board 300 may be disposed such that one camera module 200 may be detachably attached to the circular board 300 to face a first direction of the circular board 300 (e.g., to face the front face), and another camera module may be detachably attached to the circular board 300 to face a second direction opposite the first direction (e.g., to face the rear face).

Hereinafter, the above-described camera module 200 will be referred to as a first camera module 200(*a*) and a camera module 200 configured to have the same configuration as the first camera module 200(*a*) and coupled to the first camera module 200(*a*) will be referred to as a second camera module 200(*b*).

With the help of the configuration of a first bonding face 221(*a*) of the first camera module 200(*a*) and the configuration of the first seating portion 311 of the circular board 300, it is easy for the user to physically couple or separate the first camera module. With the help of the configuration of a second bonding face 221(*b*) of the second camera module 200(*b*) and the configuration of the second seating portion 312 of the circular board 300, it is easy for the user to physically couple or separate the second camera module. The first and second bonding faces 221(*a*) and 221(*b*) and the first and second seating portions 311 and 312 include magnets therein. The magnets may induce strong magnetic coupling when the first bonding face 221(*a*) and the first seating portion 311 or the second bonding face 221(*b*) and the second seating portion 312 are in face-to-face contact with each other.

The opposed and contact portions of the magnets included in the first and second bonding faces 221(*a*) and 221(*b*) and the first and second seating portions 311 and 312 are formed to have different poles, so that the camera modules 200 and the circular board 300 can be easily coupled to each other.

In addition to the contact configurations of the coupling units, the first camera module 200(*a*) and the second camera module 200(*b*) may be connected to each other as the respective communication terminals disposed on the rear face of the base come in contact with the communication terminals disposed on the circular board 300. With the wired connection of the communication terminals, the first camera module 200(*a*) and the second camera module 200(*b*) can transmit/receive data to/from each other.

The first camera module 200(*a*) may capture a hemispherical first image using the lens assembly, and the second camera module 200(*b*) may capture a hemispherical second image opposite the first image using the lens assembly.

Accordingly, by coupling the first camera module 200(*a*) and the second camera module 200(*b*), it is possible to implement a lens assembly having a 360-degree view angle and to capture a panorama moving image or a panorama image. An image synthesized without an error can be acquired through a stitching process in which the first and second captured images are stitched by an image processing unit of the first camera module 200(*a*) or the second camera module 200(*b*). Further, when the mobile device 30 is connected, it is possible to acquire a stitched moving image or a stitched image through image processing in real time in the mobile device 30. Hereinafter, a connection process of the mobile device 30 will be described.

Referring to FIG. 9, the circular board 300 connected to the above-described camera module 200 may be connected to a mobile device 30 by wireless communication.

An image obtained by the omnidirectional imaging with a pair of camera modules 200 may be processed by an image processing unit of the camera modules 200 or may be transmitted to the wirelessly connected mobile device 30 to be processed in the mobile device 30. According to an embodiment, the wireless connection scheme may include Bluetooth or Wi-Fi, and may be any of similar wireless communication methods.

According to an embodiment, when data is processed in the camera module 100 without transmitting the data to the mobile device 30, it is possible to use a method of stitching the data by an image processing unit in the camera module 100 or storing the data in a memory without the mobile device 30 is used.

However, according to an embodiment, when the electronic device is connected to the mobile device 30 so as to transmit and process data such as a photograph, a main module is first switched from the camera module 300 to the mobile device 30, and captured moving images or images stored in the circular board 300 may be collected to the mobile device 30. Accordingly, the captured data may be interlocked in real time with the mobile device 30 so as to easily process moving images or images.

In the embodiment, it has been described that when the mobile device 30 and the electronic device 20 are wirelessly connected, the mobile device 30 processes moving images or images as a main module. However, in addition to the above, it is of course possible to communicate with the mobile device 30 with wired communication using USB and to set the circular board 300 as the main module. In addition, the mobile device 30 corresponds to an example, and various devices, which are capable of transmitting data by communicating with the electronic device 20 in a wireless or wired manner, may be selected in various ways.

Hereinafter, various members that are coupled with the above-described camera module 100 or circular board 300 will be described.

Figure 10:
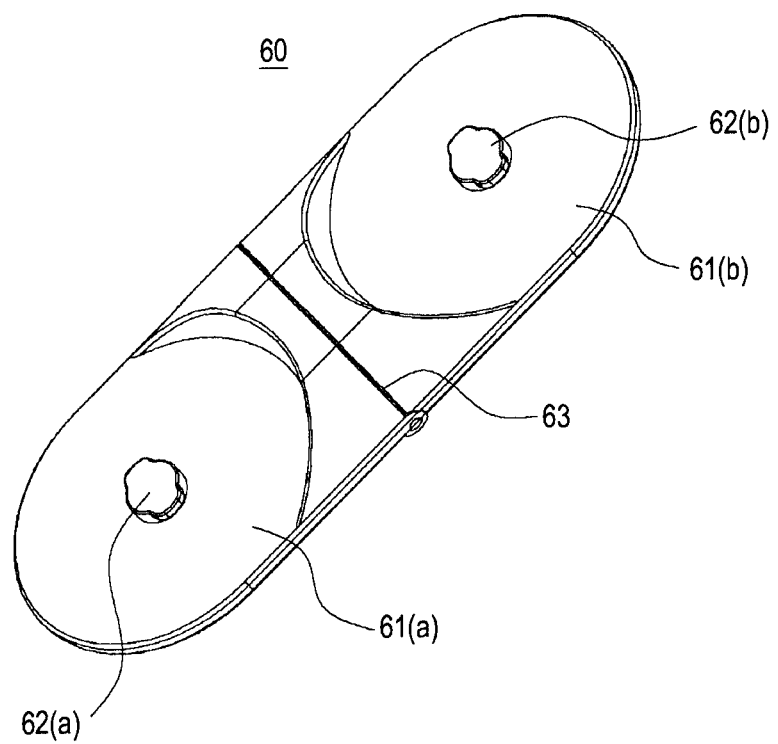
FIG. 10 is a perspective view illustrating a first member detachably attached to an electronic device according to various embodiments.

FIG. 10 is a perspective view illustrating a first member detachably attached to an electronic device according to various embodiments.

Referring again to FIGS. 1, 2, and 10, the electronic device 10 including the camera module 100 can capture an image or a moving image using the lens assembly 140 having a view angle of 180 degrees. When the coupling unit 130 of the camera module 100 is coupled with a first member 60, the first member 60 may assist the function of the lens assembly 140 so as to obtain a three-dimensional stereoscopic image or moving image.

The first member 60 may include a first detachable face 61 that is coupled with the coupling unit 130 of the camera module 100, protrusions 62 rotationally coupled to the through holes 133 in the coupling unit 130, and a rotary member 63 disposed at the center of the first member 60 and configured to be rotatable by at least 90 degrees.

According to an embodiment, the first member 60 may include two first detachable faces 62(*a*) and 62(*b*), and the first camera module 100(*a*) and the second camera module 100(*b*) may be seated on and coupled with the first detachable surface 62(*a*) and 62(*b*), respectively. The regions to be coupled with the first detachable faces 62(*a*) and 62(*b*) are respective coupling units of the first camera module 100(*a*) and the second camera module 100(*b*).

According to an embodiment, the pair of protrusions 62(a) and 62(b) of the first member 60 may be inserted into and coupled to respective through holes 133 in the first camera module 100(a) and the second camera module 100(b). The through holes 133 and the protrusions 62 may be designed to correspond to each other. For example, when the through holes 133 are designed to be extended at one sides thereof, the protrusions 62 may be formed in a protrusion shape with one side protruding to correspond to the shape of the through holes 133.

According to an embodiment, when the camera modules 100(a) and 100(b) are spaced apart from each other parallel to each other and arranged on the first detachable faces 62(a) and 62(b) of the first members 60, it is possible to derive a three-dimensional stereoscopic moving image or image by capturing an image by the interaction of the lens assemblies 240 having a 180-degree view angle.

According to an embodiment, a rotatable rotary member 63 may be disposed at the center of the first member 60. The first member 60 may be folded in half as the center of the first member 60 rotates along the rotary member 63.

Accordingly, when the first member 60 is fully extended as described above, it is possible to capture a three-dimensional stereoscopic image as described above. When the first member 60 is folded by the operation of the rotary member 63, one face is disposed to face the front side of the first camera module 100(a) and the other face is disposed to face the rear side of the second camera module 100(b), so that it is possible to capture a 360-degree panorama moving image.

According to the present disclosure, the first camera module 100(a) and the second camera module 100(b) are coupled to the first member 60 and the rotary member 63 is rotationally operated in the first member 60. Thus, there is an effect that a user can easily capture a three-dimensional stereoscopic image or a 360-degree panorama image.

Figure 11:
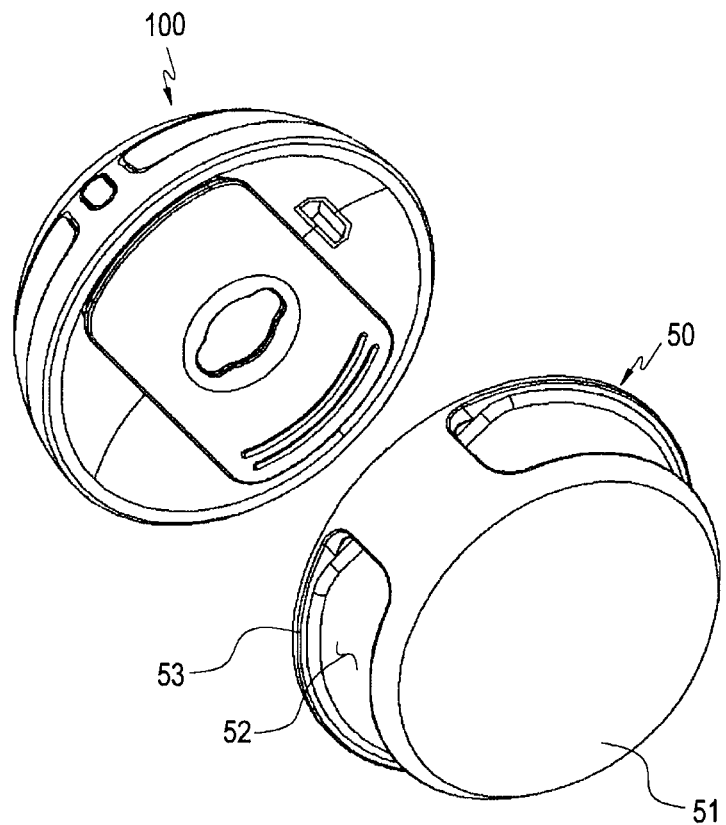
FIG. 11 is a perspective view illustrating a second member detachably attached to an electronic device according to various embodiments.

FIG. 11 is a perspective view illustrating a second member detachably attached to an electronic device according to various embodiments.

Referring again to FIGS. 4 and 11, the electronic device 10 including the camera module 100 can capture an image or a moving image using the lens assembly 140 having a view angle of 180 degrees. When the coupling unit 130 of the camera module 100 is coupled with a second member 50, the second member 50 may assist the function of the lens assembly 140 so as to obtain an image or a moving image.

The second member 50 may include a first detachable face 52 that is coupled with the coupling unit 130 of the camera module 100, a protrusion (not illustrated) rotationally coupled to the through hole 133 in the coupling unit 130, and an accommodation portion 52 including a space formed on the other side of the first detachable face 52 so as to accommodate a portion of an external device.

According to an embodiment, one face 51 of the accommodation portion 52 of the second member 50 may be disposed to face the rear side of the camera module 100, and the other face may include the first detachable face 52 and may be configured to face the coupling unit 130. Further, the accommodation portion 52 may include a slit, which is opened at one side thereof, and a portion of the external device can be inserted into the accommodation portion 52, which is the space inside the opened slit. The external device may be, for example, a mobile device 30.

According to an embodiment, a region including the camera unit of the mobile device 30 may be inserted into the accommodation portion 52, and the second member 50 coupled with the mobile device 30 may communicate a moving image or an image captured by the camera module 100 to the mobile device 30 through wireless or wired communication and may process the moving image or the image.

The present disclosure has an effect that a user can conveniently capture an image having a 180-degree view angle by coupling the second member 50 with the camera module 100 and the external device.

Figure 12:
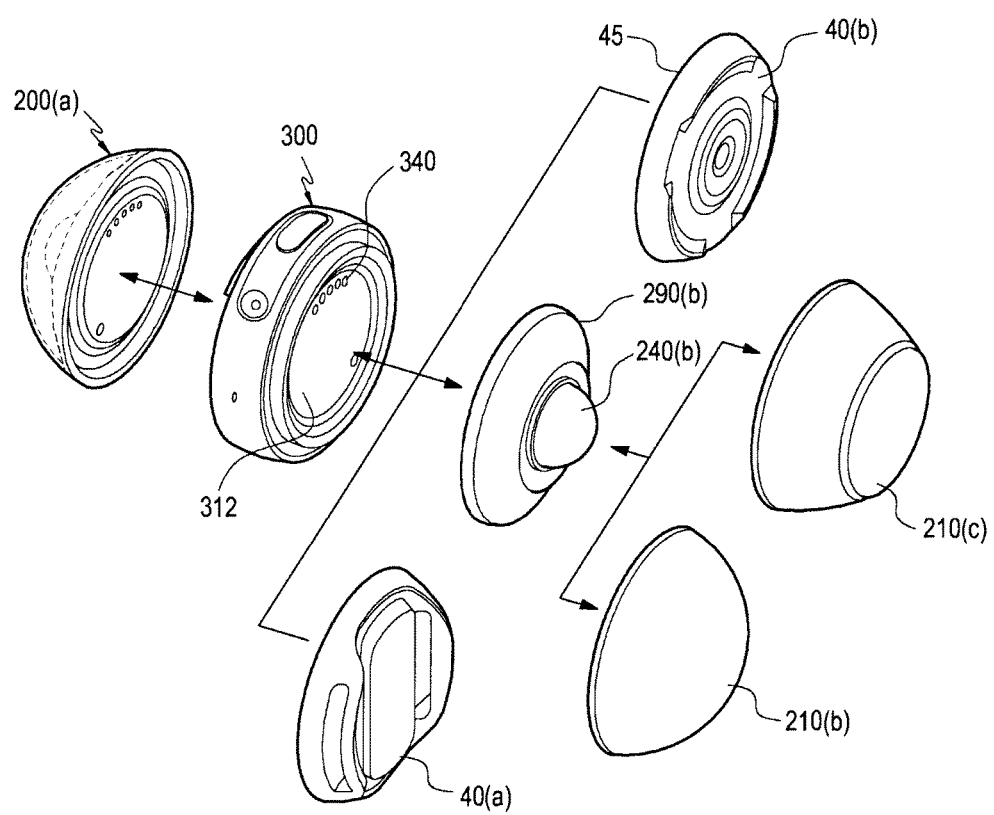
FIG. 12 is a perspective view illustrating various members detachably attached to an electronic device according to various embodiments.

FIG. 12 is a perspective view illustrating various members detachably attached to an electronic device according to various embodiments.

Referring to FIGS. 9 and 12, the first camera module 200 may be coupled to one of two seating portions 311 and 312 of the circular board 300 so as to capture an image or a moving image. In addition, the second camera module 200 may be coupled to the remaining one of the two seating portions 311 and 312 so as to capture an image or a moving image, as described above. On the contrary, a third housing 210(c) having a truncated cone shape may be used in addition to the hemispherical second housing 210(b) constituting the second camera module 200.

The third housing 210(c) having the truncated cone shape protects the inner lens assembly 240(b) like the above-described housings and may be made of a transparent glass material in order to capture an image or a moving image. However, the upper portion of the third housing 210(c) may be formed in a flat face so as to constitute a support face which allows the electronic device 20 having the circular board 300 to be installed on a floor. For example, when the electronic device is installed on a table made of glass, there is an effect that a camera module having a 360-degree view angle can be used as a whole without an external constituent device.

Figure 13A:
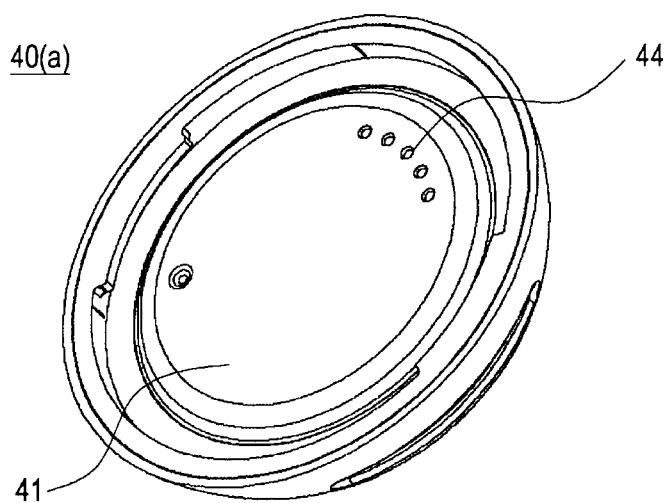
FIG. 13A and FIG. 13B are perspective views illustrating a third member detachably attached to an electronic device according to various embodiment.
Figure 13B:
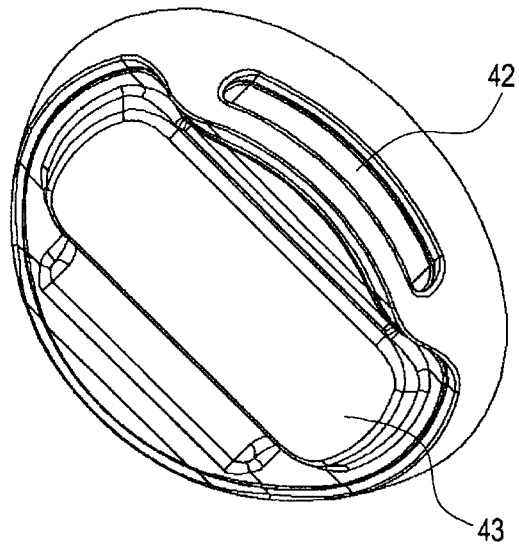

FIG. 13A and FIG. 13B are perspective views illustrating a third member detachably attached to an electronic device according to various embodiment.

Referring again to FIGS. 12 and 13, the electronic device 20 including the camera module 200 can capture an image or a moving image using the lens assembly 240 having a view angle of 180 degrees. In addition, when the seating portion 310 of the circular board 300 of the electronic device 20 is coupled with the third member 40(a), the third member 40(a) assists the movement of the lens assembly 240 so as to conveniently capture a three-dimensional stereoscopic image or moving image.

The third member 40(a) may include a third detachable face 41, which is coupled with the seating portion 310 of the circular board 300, and at least one opening slit 42, which is connected to the third detachable face 41 and is inclined inwardly of the third member 40. Further, the third member 40(a) may include a contact face 43 which is disposed to face a direction opposite the third detachable face 41 and is configured to fix an external device thereon.

According to an embodiment, the third detachable face 41 may be generally formed in a recessed stepped shape, and may include a convex face at the central portion thereof. Therefore, the third detachable face 41 is designed to have a shape corresponding to that of the seating portion 310 of the circular board 300, thereby inducing safe coupling. Further, the third detachable face 41 and the seating portion 310 may be coupled in a sliding manner or may be magnetically coupled by disposing magnets therein.

According to an embodiment, at least one communication terminal 44, which is capable of communicating with a communication terminal of the seating part 310 by wired connection, may be disposed on the outer surface of the third detachable face 41.

According to one embodiment, the contact surface 43 may include at least one opened slit 42 through which a belt or band may extend so as to fix an external device. For example, when the contact face 43 is fixed to the upper portion of the user's arm using a band, the user may capture an image of the surrounding landscape or a person in real time while moving.

Through the coupling of the third member 40 and the circular board 300 of the present disclosure, the user may easily capture a moving image or an image while keeping both hands free.

Figure 14A:
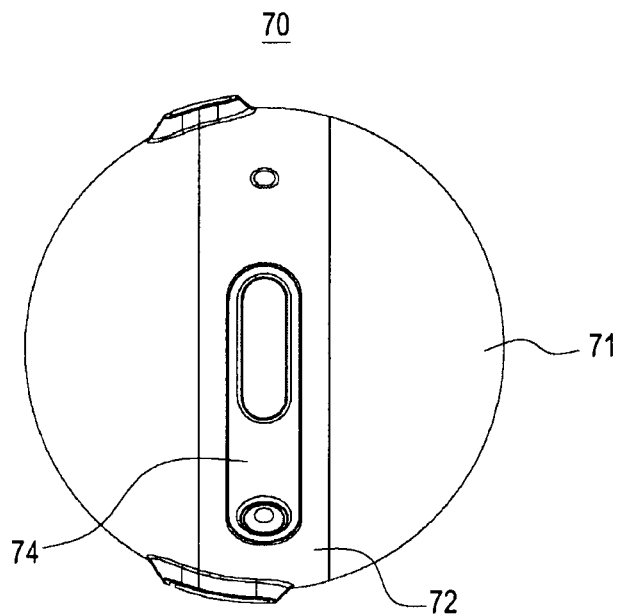
FIG. 14A and FIG. 14A are perspective views illustrating a fourth member detachably attached to an electronic device according to various embodiments.
Figure 14B:
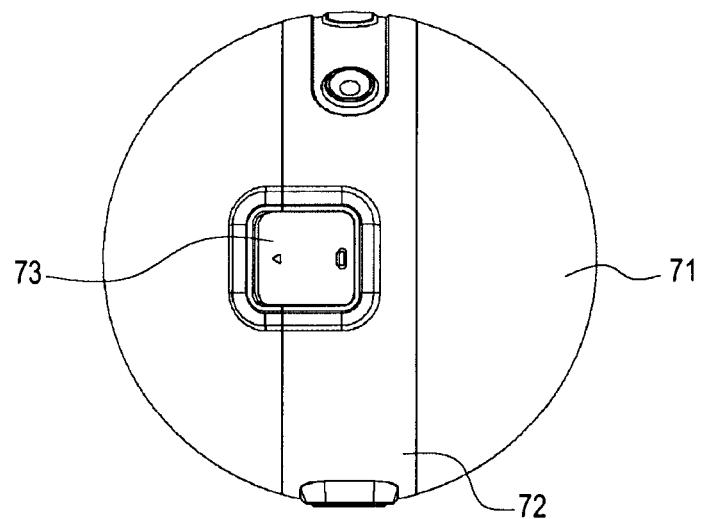

FIG. 14A and FIG. 14B are perspective views illustrating a fourth member detachably attached to an electronic device according to various embodiments.

Referring again to FIGS. 12 and 14, the electronic device 20 including a pair of camera modules 200 can capture a panorama image or moving image using the lens assemblies 240 having a view angle of 360 degrees. When the electronic device 20 and a fourth member 70 having a waterproof function are coupled to each other, an image or a moving image of a landscape or a person can be conveniently captured without fear of flooding outdoors with water.

The fourth member 70 may be disposed on the outer side so as to surround the circular board 300 and may include a transparent waterproof housing 71 disposed on the outer side so as to surround a waterproof board 72 coupled with the circular board 300 and the housing 210.

According to an embodiment, the waterproof board 72 of the fourth member 70 may include a fourth detachable face 74 capable of being coupled with an outer surface portion of the circular board 300. By the coupling of the fourth detachable face 74 and the circular board 300, the rotation or movement of the electronic device disposed inside the fourth detachable face 74 is blocked, so that the field of view for a region required for capturing an image by the lens assembly 240(b) can be secured precisely.

According to an embodiment, the fourth member 70 is formed in a spherical shape as a whole, and the waterproof housing 71 may be opened, so that the camera module 200 and the circular board 300 can be inserted into the waterproof housing 71. The waterproof housing 71 may further include a button unit 73 that is set to an on position when the waterproof housing is capable of being opened and is set to an off position when performing a waterproof function.

In the present disclosure, the fourth member 70 is implemented to surround the outer face of the electronic device 30 and has a waterproof function that blocks foreign matter or the like. Thus, the user may not worry about flooding the camera at a beach or outdoors. For example, the electronic device 30 can be easily used for underwater imaging or aerial imaging.

Figure 15A:
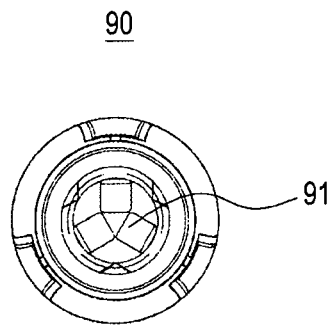
FIG. 15A and FIG. 15B are perspective views illustrating a fifth member detachably attached to an electronic device according to various embodiments.
Figure 15B:
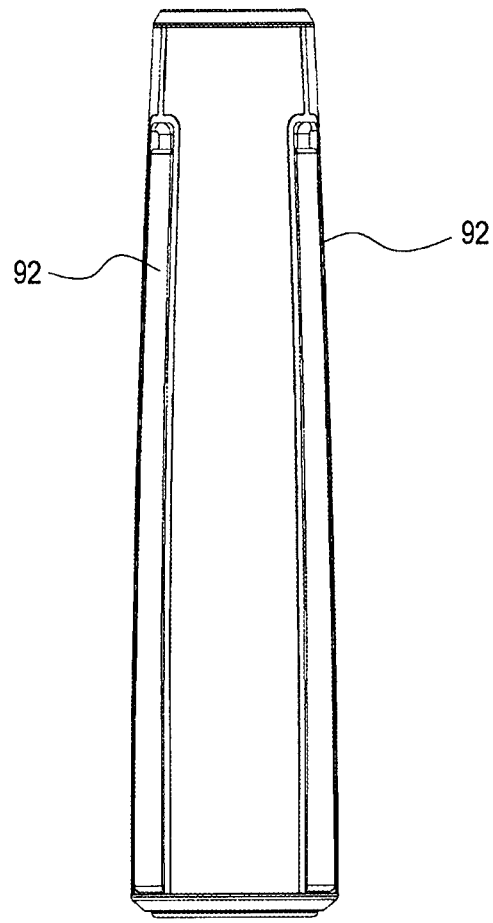

FIG. 15A and FIG. 15B are perspective views illustrating a fifth member detachably attached to an electronic device according to various embodiments.

Referring again to FIG. 12, two types of third members 40 that are coupled with the circular board 300 are illustrated. Referring to a third member 40(b) other than the above-described one third member 40(a), the third detachable face 45 of the third member 40(b) is formed in a recessed stepped shape as a whole and may have a convex face at the central portion thereof. Therefore, the third detachable face 45 is designed to have a shape corresponding to that of the seating portion 310 of the circular board 300, thereby inducing safe coupling. Further, the third detachable face 45 and the seating portion 310 may be coupled in a sliding manner or may be magnetically coupled by disposing magnets therein.

According to an embodiment, at least one communication terminal, which is capable of communicating with a communication terminal of the seating part 310 by wired connection, may be disposed on the outer surface of the third detachable face 45.

Referring to FIGS. 12 and 15, in the electronic device 20 in which the first camera module 200 and the circular board 300 are coupled to each other, the third member 40(b) may be coupled to the second seating portion 312 on the side opposite the circular board 300. The third member 40(b) may be coupled with the fifth member 90 such that an image of a landscape or a person can be captured from a remote distance from the user. The fifth member 90 may be, for example, a tripod.

The fifth member 90 may include, on the upper side thereof, a fifth detachable surface 91 that can be coupled with or separated from the third member 40(b). Further, the fifth member 90 may be disposed below the fifth detachable face 91 and may include three triangular legs 92 that can be installed on a floor without shaking. Since the triangular legs 92 are generally known, a detailed description thereof will be omitted.

According to one embodiment, when the third member 40(b) is fixed to the fifth detachable face 91 of the fifth member 90, the first camera module 200 located opposite the third member 40(b) is able to conveniently and effectively acquire a moving image or an image of a desired place and a person at a remote location using the lens assembly 240 having a view angle of 180 degrees.

While the present disclosure has been shown and described with reference to certain embodiments thereof, it will be apparent to those skilled in the art that the camera lens module according to the present disclosure is not limited to these embodiments, and various changes in form and details may be made therein without departing from the spirit and scope of the present disclosure as defined by the appended claims.

What is claimed is:

1. An electronic device with a first camera module, the electronic device comprising:
    a housing;
    a lens assembly disposed inside the housing and including at least one wide-angle lens;
    an image sensor disposed under the lens assembly, and configured to convert a hemispherical optical image transmitted from the lens assembly into an electrical signal;
    a base disposed under the housing and configured to mount the image sensor or a printed circuit unit thereon; and
    a coupling unit disposed on a face of the base and including at least one magnet for coupling with an external device, wherein the coupling unit includes a plate spaced apart from a rear surface of the base, and a support member configured to connect the rear surface of the base and the plate.

2. The electronic device of claim 1, further comprising:
    a communication unit disposed on the rear surface of the base and including at least one communication terminal configured to communicate the hemispherical optical image captured from the lens assembly, in a wired or wireless manner.

3. The electronic device of claim 1, wherein the wide-angle lens includes a fish-eye lens,
    the coupling unit further includes at least one magnet disposed inside the plate, and induces magnetic coupling with the external device, and wherein the plate includes at least one through hole connected to an outside.

4. The electronic device of claim 1, further comprising:
a battery disposed in the base to face the printed circuit unit,
wherein the printed circuit unit is disposed between the battery and the image sensor.

5. The electronic device of claim 1, further comprising:
wherein the external device comprises a second camera module corresponding to the first camera module, and
wherein a first coupling unit of the first camera module and a second coupling unit disposed on a rear face of the second camera module form a magnetic coupling in face-to-face contact with each other so as to capture an omni-directional image.

6. The electronic device of claim 5, wherein a first communication terminal of the first camera module and a second communication terminal disposed on the rear face of the second camera module are disposed to face each other so as to communicate a captured image and information with each other using a wired connection.

7. The electronic device of claim 1, further comprising:
an annular protective member disposed above the base within the housing and formed to surround the lens assembly,
wherein the protective member is formed at a slope lowered outward from a center thereof to secure a 180-degree view of the lens assembly.

8. The electronic device of claim 1, wherein the external device comprises a second camera module, and further comprising:
a foldable first member, which is detachably attached to the first camera module and the second camera module
wherein the first member includes a pair of first detachable faces that are spaced apart from each other such that the first camera modules and the second camera module are capable of being seated thereon to be spaced from and parallel to each other, and a rotary member disposed at the center of the first member such that each of the first detachable face can be rotated to be folded.

9. The electronic device of claim 8, wherein, when the pair of first detachable faces are arranged parallel to each other in a plane, a three-dimensional stereoscopic image is captured by an interaction of the first camera module and the second camera module disposed on the first detachable face, and
when the pair of first detachable faces are folded due to rotation of the rotary member, the one first camera module is oriented in a first direction and the second camera module is disposed to be oriented in a second direction opposite the first direction such that an omni-directional panorama image is captured.

10. The electronic device of claim 1, further comprising:
a second member, which is detachably attached to the first camera module,
wherein the second member includes a second detachable face which is detachably attached to the coupling unit of the first camera module, and an accommodation portion including a space formed on a side opposite the second detachable face so as to accommodate a portion of the external device.

11. The electronic device of claim 1, wherein the coupling unit includes the plate rotatably connected to a rear surface of the base.

12. An electronic device comprising:
a first camera module; and
a circular board configured to transmit/receive data in a wired or wireless manner,
wherein the first camera module includes:
a housing;
a lens assembly disposed within the housing and including at least one wide-angle lens;
an image sensor disposed below the lens assembly and configured to convert a hemispherical optical image transmitted from the lens assembly into an electrical signal;
a base configured to support the image sensor and having at least one first communication terminal disposed thereon for a communication connection with the circular board; and
an annular protective member disposed above the base within the housing, and configured to fix the at least one wide-angle lens and formed to surround the lens assembly, wherein the protective member is formed at a slope lowered outward from a center thereof to secure a 180-degree view of the lens assembly,
wherein the circular board is detachably attached to face a rear face of the camera module, and is configured to mount a battery or a printed circuit board thereon.

13. The electronic device of claim 12, wherein the circular board has a cylindrical shape and has a first seating portion and a second seating portion on one face and another face, respectively, the first camera module is seated on and coupled to the first seating portion, and a second camera module having the same configuration as the first camera module is seated on and coupled to the second seating portion.

14. The electronic device of claim 13, wherein the first and second seating portions have a recess shape and include a stepped engagement portion such that the first and second seating portions are respectively coupled with the first and second camera modules in a sliding manner according to rotation of the first and second camera modules, and
the printed circuit includes a first printed circuit unit and a second printed circuit unit, the first printed circuit unit being disposed above the battery disposed in the circular board to face the battery and the second printed circuit unit is disposed below the battery to face the battery.

15. The electronic device of claim 12, wherein the circular board further includes a communication unit configured to communicate the hemispherical image captured from the lens assembly using a wired connection or wirelessly, and
the communication unit includes a second communication terminal disposed at one side of a seating unit and wired to the first communication terminal of the first camera module.

* * * * *